United States Patent [19]

Flynn, Jr. et al.

[11] 4,256,707

[45] Mar. 17, 1981

[54] SELECTIVE REMOVAL OF MERCURY FROM CYANIDE SOLUTIONS

[75] Inventors: Charles M. Flynn, Jr., Reno; Thomas G. Carnahan, Sparks; Roald E. Lindstrom, Reno, all of Nev.

[73] Assignee: The United States of America as represented by the Secretary of the Interior, Washington, D.C.

[21] Appl. No.: 87,852

[22] Filed: Oct. 24, 1979

[51] Int. Cl.$^3$ .................. C01G 13/00; C01C 3/08
[52] U.S. Cl. ........................ 423/42; 423/29; 423/43; 423/101; 75/118 R
[58] Field of Search .............. 423/29, 37, 42, 43, 423/101, 102

[56] References Cited

U.S. PATENT DOCUMENTS

| 828,287 | 8/1906 | Hobson | 423/29 |
|---|---|---|---|
| 935,337 | 9/1909 | Thwaites | 423/101 |
| 1,198,086 | 9/1916 | Vandercook | 423/29 |
| 4,072,587 | 2/1978 | Heinen | 423/37 |

FOREIGN PATENT DOCUMENTS 52-31810  8/1977  Japan ....................... 423/101

OTHER PUBLICATIONS

Neuhausen, B., "The Mode of Reaction of Highly Insoluble or Undissociated Salts", *Science*, vol. 57, No. 1462, p. 26, (1923).

*Primary Examiner*—Brian E. Hearn
*Attorney, Agent, or Firm*—William S. Brown; Donald A. Gardiner

[57] ABSTRACT

A rapid, energy efficient, low cost, nonhazardous method for the selective removal of mercury from mercury-containing metal cyanide solutions, particularly the cyanide solutions resulting from the cyanidation of gold ore and the like, wherein a reactive sulfide is admixed with the solution for a time sufficient to form an insoluble mercuric sulfide precipitate. The mercuric sulfide precipitate is then separated from the metal cyanide solution by filtration or other conventional means.

5 Claims, No Drawings

SELECTIVE REMOVAL OF MERCURY FROM CYANIDE SOLUTIONS

TECHNICAL FIELD

The present invention relates generally to the removal of mercury from industrial process solutions and, specifically, to a method for the selective removal of mercury from metal cyanide solutions such as those obtained in the processing of gold ores and the like.

BACKGROUND ART

Ores mined for their gold and/or silver content typically contain other metals, such as mercury and a variety of base metals. The lower the grade of the ore, the more likely it is to contain metal impurities which should be removed before the gold and/or silver is refined. Of all the metals likely to be found in gold and/or silver-containing ores, it is the mercury in particular which is the most difficult to remove from cyanide solution and presents the most serious threat of contamination.

In one method widely used to process gold-containing ores, the ore is contacted with a cyanide solution which converts the gold in the ore to soluble gold cyanide. Other precious and base metals in the ore also go into solution, primarily as metal cyanide complexes. The gold is then recovered by one of several well known processes, such as Merrill-Crowe precipitation. Typically, some of the other precious and base metals in solution with the gold cyanide will precipitate out with the gold. The removal of these other metals, especially the mercury, from the Merrill-Crowe precipitate is essential to the successful refining of the gold.

One procedure currently used to separate mercury from the precious metal precipitate formed during Merrill-Crowe precipitation subjects the precipitate to a temperature of about 650° C. (1200° F.) in an electrically heated retort for about 24 hours. The mercury and some zinc are subsequently recovered in a pipe condenser. Although this method successfully removes the mercury, it is accompanied by serious disadvantages, not the least of which involves the hazards to the health of operating personnel posed by the highly toxic mercury vapors given off during the retorting process. The personnel which operate the special equipment needed for this process must be monitored constantly for signs of mercury poisoning. In addition, the large amount of energy necessary to maintain the precipitate at such extremely high temperatures for the lengthy time period required to remove the mercury makes this process an extremely costly one in many respects. Moreover, mercury is not always the only metal removed by the aforementioned process; zinc is also usually recovered and tends to accumulate in undesirable amounts in the condenser section of the equipment used to practice this method.

DISCLOSURE OF INVENTION

Accordingly, it is an object of the present invention to provide a method whereby mercury is selectively removed from precious metal cyanide process solutions quickly, effectively, safely and with the expenditure of a minimum amount of energy.

It is an additional object of the present invention to provide a low cost method for the selective removal of mercury from precious metal and other industrial cyanide process solutions.

Other objects and advantages will become apparent from the following description and appended claims.

Briefly stated, in accordance with the aforesaid objects a method for the selective removal of mercury from metal cyanide solutions is provided which includes the steps of admixing a reactive metal sulfide, preferably precipitated $Ag_2S$ or $ZnS$, with a mercury-containing metal cyanide solution, preferably one obtained as a result of the cyanidation of gold-containing ore at ambient temperatures and atmospheric pressure to precipitate the mercury as insoluble HgS, leaving the other metals values remaining in solution. The solution is filtered to separate the HgS precipitate and the filtrate processed further by methods known to those skilled in the art to recover the precious and/or base metals contained therein.

BEST MODE FOR CARRYING OUT THE INVENTION

The method of the present invention comprises stirring a freshly precipitated metal sulfide, preferably $Ag_2S$ or $ZnS$, into a mercury-containing metal cyanide solution, such as that resulting from the cyanidation of gold and silver containing ore at ambient temperatures and atmospheric pressure, to precipitate substantially all of the mercury in the solution as insoluble HgS. The resulting suspension is filtered to separate the HgS precipitate from the cyanide solution which contains the other metals originally present in the ore. This metal cyanide solution is processed further by methods known to those skilled in the art to recover the metals contained therein.

The present process is particularly useful and effective in the removal of mercury from cyanide solutions containing mercury, gold, silver and other base metals. Typically, such solutions are produced as a result of the cyanidation of precious metal ores. When these ores are subjected to the cyanidation process, which is well known to those skilled in the art, mercury and the other metals in the ore dissolve to form a metal cyanide pregnant solution containing metal cyanide complexes. The present method may also be applied to achieve the selective removal of mercury from other process solutions which contain metal cyanide complexes, such as electroplating and electrowinning solutions. Mercury removal from the aforementioned solutions is achieved effectively by the present method when the pH of the mercury-containing metal cyanide solution is in the range of about 9.0 to 12.0, which is the typical pH of metallurgical solutions.

It has always been well known that sulfides will cause the precipitation of $Ag_2S$ and/or HgS from cyanide and other solutions. See, for example, U.S. Pat. Nos. 935,337 and 4,072,587. Now it has been discovered that the addition of a sulfide to a mercury-containing metal cyanide pregnant solution will cause the formation and selective precipitation of a sulfide precipitate of mercury (as HgS) and that the co-precipitation of other metal sulfides, such as $Ag_2S$, is either retarded or precluded. In particular, when the sulfide is added in from stoichiometric to moderately excessive amounts relative to mercury, the formation of insoluble HgS is distinctly favored. However, the gold cyanide complexes present in the solution do not form precipitates with the addition of a sulfide, as shown by the following equation:

$Au(CN)_2 + S^{-2}$, $Ag_2S$ or $ZnS \rightarrow$ no reaction

The addition of a sulfide, therefore, permits the removal and subsequent separation of HgS precipitates from the silver, gold or other metal values in the metal cyanide pregnant solution.

Thus, the selective precipitation and, hence, ready separation of mercury from gold and silver in metal cyanide pregnant solutions can be readily achieved by the addition of a sufficient amount of a sulfide to precipitate the mercury as insoluble HgS. A stoichiometric to a modest excess of sulfide beyond a stoichiometric amount relative to the amount of mercury present in the cyanide solution will selectively precipitate the mercury over the silver. Generally, the stoichiometric to twice the stoichiometric amount of sulfide will achieve the desired goal of precipitating as much mercury and as little silver as possible. Preferably, however, the stoichiometric amount plus an excess of about 10% to 50% of the stoichiometric amount of sulfide should be used.

Reactive soluble or insoluble sulfides, such as metal sulfides, have been found to be most effective for use in the present process. Satisfactory results have been obtained using sodium sulfide ($Na_2S$) and iron sulfide (FeS) to precipitate mercury from cyanide solutions as disclosed herein. Especially preferred for this purpose, however, are precipitated silver sulfide ($Ag_2S$) and zinc sulfide (ZnS). The formation of these reactive sulfides may be by any one of a number of conventional methods well known to those skilled in the art.

The reactive metal sulfide compound may be added either as a solid or as an aqueous suspension to the mercury-containing metal cyanide pregnant solution. After the addition of sufficient sulfide to the cyanide solution the resulting mixture is stirred for about 10 to 20 minutes to promote the chemical reaction between the sulfide ions and mercury ions to precipitate insoluble mercuric sulfide (HgS). The reaction readily proceeds to completion at ambient or room temperatures, typically about 10° C. to about 30° C., and atmospheric pressure. Separation of the HgS precipitate from the precious metal-containing cyanide solution may be carried out by conventional filtration procedures. The gold and/or other precious metals may then be recovered, substantially free from mercury contamination, from the cyanide solution by zinc precipitation or other methods well known to those skilled in the gold and precious metal refining art.

The following chemical equations are illustrative of typical reactions which are believed to occur upon the addition of a sulfide to a mercury containing metal cyanide pregnant solution:

$Hg(CN)_4^{-2} + S^{-2} \rightarrow \underline{HgS} + 4CN^{-1}$ $Hg(CN)_4^{-2} + ZnS \rightarrow \underline{HgS} + Zn(CN)_4^{-2}$ $Hg(CN)_4^{-2} + Ag_2S \rightarrow \underline{HgS} + 2Ag(CN)_2^{-1}$ $2Ag(CN)_2^{-1} + S^{-2} \rightarrow \underline{Ag_2S} + 4CN^{-1}$ $2Ag(CN)_2^{-1} + ZnS \rightarrow \underline{Ag_2S} + Zn(CN)_4^{-2}$ These equations show that reaction of a sulfide compound with silver and mercury cyanide complexes leads to precipitation of silver as $Ag_2S$ precipitate either forms more slowly or soon dissolves because, when a modest excess of sulfide for precipitation of the mercury is added, little silver is precipitated. This is probably due to the HgS compound being less soluble than $Ag_2S$.

Hence, mercury can be selectively precipitated and therefore separated from gold and silver in cyanide solutions by the addition of a sufficient amount of metal sulfide to precipitate the mercury as HgS.

It will be noted that at no time during the practice of this process are operating personnel subjected to toxic mercury vapors, as is possible with currently available mercury removal methods, since processing temperatures never begin to approach the 357° C. boiling point of mercury or the 560° C. temperature at which solid mercuric sulfide sublimes. In addition, the time and energy conserving advantages of this process over prior art processes should be readily apparent.

The following Examples are intended to be illustrative of the present invention and are not intended to limit its scope in any way.

EXAMPLE I

A gold cyanide pregnant solution was produced by the cyanidation of gold-containing ore and contained the following metals and compounds in the amounts indicated: 20 mg/l Au; 10 mg/l Hg; 10 mg/l Ag; 6 mg/l Cu; and 500 mg/l NaCN. The solution had a pH of 10.0. 40 ml of this solution was mixed with 60 mg of freshly precipitated $Ag_2S$ and stirred for 10 minutes at room temperature and atmospheric pressure to produce an insoluble precipitate of HgS. This HgS precipitate was separated from the metal cyanide solution by centrifugation, and the centrifugate was analyzed. The analysis demonstrated that 99% of the mercury originally present in the gold cyanide pregnant solution was removed by the formation of the HgS precipitate.

EXAMPLE II 40 ml of the gold cyanide pregnant solution of Example I was stirred with 0.4 mg of freshly precipitated $Ag_2S$ for 15 minutes at room temperature. The HgS precipitate produced was separated from the metal cyanide solution by centrifugation, and the centrifugate was analyzed. Analysis of the filtrate showed that 50% of the mercury in the gold cyanide pregnant solution was removed as HgS, but that none of the gold or copper was removed.

EXAMPLE III 40 ml of the gold cyanide pregnant solution of Example I was stirred with 0.3 mg of freshly precipitated ZnS for 15 minutes at room temperature and the HgS precipitate produced was separated from the solution and the filtrate was analyzed as in Examples I and II. Use of the ZnS removed 90% of the mercury and only 10% of silver from the original solution.

EXAMPLE IV 40 ml of the gold cyanide pregnant solution of Example I was stirred with 0.16 mg $Na_2S$ for 15 minutes at room temperature. A pale brown colloidal suspension was produced which flocculated after about 40 hours. Separation and subsequent analysis of the filtrate thus produced demonstrated that 60% of the mercury in the original solution was removed as solid HgS. However, the analysis also showed that none of the silver, gold or copper in the original solution had been removed.

EXAMPLE V 40 ml of the gold cyanide pregnant solution of Example I was stirred with 6.0 mg of freshly precipitated FeS for 10 minutes at room temperature and the resulting solid HgS separated from the metal cyanide solution and the centrifugate analyzed. The analysis demonstrated that 98% of the mercury in the original solution was removed as HgS.

INDUSTRIAL APPLICABILITY

The method of the present invention finds its primary applicability in the removal of mercury from cyanide solutions obtained in the processing of gold ores. The process disclosed herein will find further application in the removal of mercury from cyanide electroplating solutions, for recovering mercury from gold or silver electrowinning solutions or for recovering mercury from other industrial process solutions containing mercury cyanide complexes. In addition, the method of the present invention can be used to achieve the selective precipitation of mercury from other precious metal and mercury complexing agent solutions such as those containing thiosulfate, thiourea or thiophosphate.

We claim:

1. A method for the selective removal of mercury from gold cyanide solutions comprising the steps of:
   (a) admixing a reactive metal sulfide selected from the group consisting of freshly precipitated $Ag_2S$, ZnS or FeS with said solution to form an insoluble mercuric sulfide precipitate and a substantially mercury-poor solution; and
   (b) separating said mercuric sulfide precipitate from said substantially mercury-poor solution.

2. A method as claimed in claim 1, wherein said gold containing solution comprises the gold cyanide pregnant solution resulting from the cyanidation of gold-containing ore.

3. A method as claimed in claims 1 or 2, wherein said sulfide is ZnS.

4. A method as claimed in claims 1 or 2, wherein said sulfide is $Ag_2S$.

5. A method as claimed in claims 1 or 2, wherein said sulfide is admixed with said gold-containing solution in an amount which ranges from a stoichiometric amount to a modest excess beyond a stoichiometric amount of sulfide based upon the concentration of mercury present in said gold-containing solution.

* * * * *